United States Patent
Seo et al.

(10) Patent No.: US 10,137,888 B2
(45) Date of Patent: Nov. 27, 2018

(54) METHOD FOR GUIDING PARKING MODE IN REMOTE AUTOMATIC PARKING SUPPORT SYSTEM

(71) Applicant: Hyundai Motor Company, Seoul (KR)

(72) Inventors: Gil Won Seo, Gyeonggi-do (KR); Jun Soo Kim, Seoul (KR); Chan Hee Jung, Gyeonggi-do (KR); Wan Seok Yang, Seoul (KR); Sung Yun Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 156 days.

(21) Appl. No.: 15/279,306

(22) Filed: Sep. 28, 2016

(65) Prior Publication Data

US 2018/0022345 A1 Jan. 25, 2018

(30) Foreign Application Priority Data

Jul. 20, 2016 (KR) .................. 10-2016-0091891

(51) Int. Cl.
*B60W 30/06* (2006.01)
*G05D 1/00* (2006.01)
*B60T 7/12* (2006.01)

(52) U.S. Cl.
CPC .............. *B60W 30/06* (2013.01); *B60T 7/12* (2013.01); *G05D 1/0011* (2013.01); *B60T 2201/10* (2013.01)

(58) Field of Classification Search
CPC ........ B60W 30/06; G05D 1/0011; B60T 7/12; B60T 2201/10
See application file for complete search history.

(56) References Cited

U.S. PATENT DOCUMENTS

| | | | | |
|---|---|---|---|---|
| 7,263,420 B2* | 8/2007 | Tanaka | ............... | B62D 15/0285 701/36 |
| 7,599,773 B2* | 10/2009 | Tanaka | ............... | B62D 15/0285 340/932.2 |
| 7,724,180 B2* | 5/2010 | Yonak | ................... | G01S 13/931 342/70 |
| 8,319,614 B2* | 11/2012 | Takano | ..................... | B60R 1/00 340/3.1 |
| 9,505,403 B2* | 11/2016 | Stefan | ................ | B62D 15/0285 |
| 9,522,675 B1* | 12/2016 | You | ........................ | B60W 30/06 |
| 9,846,430 B2* | 12/2017 | Hiei | ......................... | B60Q 9/00 |

(Continued)

FOREIGN PATENT DOCUMENTS

| | | |
|---|---|---|
| JP | 2002-067901 A | 3/2002 |
| JP | 2003-205763 A | 7/2003 |

(Continued)

*Primary Examiner* — Frederick M Brushaber
(74) *Attorney, Agent, or Firm* — Mintz Levin Cohn Ferris Glovsky and Popeo, P.C.; Peter F. Corless

(57) ABSTRACT

A method for guiding a parking mode in a remote automatic parking support system is provided. The remote automatic parking support system includes a first mode and a second mode. In the first mode, automatic parking is performed based on a parking request from a smart key or a smartphone of a driver positioned extraneous to a vehicle and in the second mode, automatic parking is performed based on a parking request from a switch mounted within the vehicle. The vehicle is guided in first mode or the second mode based on a surrounding environment, thereby providing optimal convenience to the driver.

8 Claims, 2 Drawing Sheets

(56) References Cited

U.S. PATENT DOCUMENTS

| | | | |
|---|---|---|---|
| 2002/0023818 A1 | 2/2002 | Yanaka et al. | |
| 2009/0121899 A1* | 5/2009 | Kakinami | B62D 15/027 |
| | | | 340/932.2 |
| 2010/0019934 A1* | 1/2010 | Takano | B60R 1/00 |
| | | | 340/932.2 |
| 2010/0332078 A1* | 12/2010 | Hering | G01S 15/87 |
| | | | 701/36 |
| 2014/0222252 A1* | 8/2014 | Matters | B62D 15/027 |
| | | | 701/2 |
| 2015/0081174 A1* | 3/2015 | Marczok | B60Q 9/005 |
| | | | 701/41 |
| 2018/0022345 A1* | 1/2018 | Seo | B60T 7/12 |
| 2018/0024559 A1* | 1/2018 | Seo | G05D 1/021 |
| | | | 701/23 |
| 2018/0105167 A1* | 4/2018 | Kim | B60W 30/06 |
| 2018/0105208 A1* | 4/2018 | Kim | B62D 15/0285 |
| 2018/0107207 A1* | 4/2018 | Kim | B60W 30/06 |
| 2018/0208114 A1* | 7/2018 | Kinoshita | G06T 1/00 |

FOREIGN PATENT DOCUMENTS

| | | |
|---|---|---|
| JP | 2006-193011 A | 7/2006 |
| JP | 5408344 B2 | 2/2014 |
| JP | 2015120403 A | 7/2015 |
| KR | 10-2001-0057645 A | 7/2001 |
| KR | 10-2009-0022129 A | 3/2009 |
| KR | 2011-0114893 A | 10/2011 |
| KR | 10-2016-0033524 A | 3/2016 |

\* cited by examiner

METHOD FOR GUIDING PARKING MODE IN REMOTE AUTOMATIC PARKING SUPPORT SYSTEM

CROSS-REFERENCE TO RELATED APPLICATION

This application is based on and claims the benefit of priority to Korean Patent Application No. 10-2016-0091891, filed on Jul. 20, 2016, in the Korean Intellectual Property Office, the disclosure of which is incorporated herein in its entirety by reference.

TECHNICAL FIELD

The present disclosure relates to a method for guiding a parking mode in a remote automatic parking support system and, more particularly, to a technique of guiding a first mode in which automatic parking is performed based on a parking request from a smart key or a smartphone of a driver positioned extraneous to a vehicle and a second mode in which automatic parking is performed based on a parking request from a switch mounted within a vehicle, based on a surrounding environment, in a remote automatic parking support system.

BACKGROUND

In general, a smart cruise control (SCC) system, a smart parking assist system (SPAS), a lane keeping assist system (LKAS), a blind spot detection (BSD) system, a lane departure warning system (LDWS), a side obstacle warning system (SOWS), and the like, are installed within vehicles to assist drivers' convenience and driving. Particularly, the number of installed systems differs according to vehicle types and classes. In other words, all the systems may be installed in a vehicle of high specifications, while only some of the systems may be installed in a vehicle of low specifications.

A remote automatic parking support system is a system installed within a vehicle, in which, a process up to searching for a parking space, among the entire parking processes, is performed by the intervention of a driver, and after a parking space is detected, parking is automatically performed without intervention of the driver. In other words, the remote automatic parking support system automatically performs gear-shifting, steering, a vehicle speed, and the like, required in a process of moving the vehicle to the parking space.

The remote automatic parking support system has a first mode in which automatic parking is performed based on a parking request via a smart key or a smartphone of a driver positioned extraneous to a vehicle and a second mode in which automatic parking is performed based on a parking request through a switch mounted within the vehicle, and performs automatic parking in the first or second mode based on a driver's selection. A related art remote automatic parking support system, however, is not capable of guiding an optimal parking mode regarding a space (detected parking space) in which a vehicle is intended to be parked, and thus, a driver may not be able to exit the vehicle due to shortage of extra space after parking. Additionally, the related art remote automatic parking support system is not capable of guiding an optimal parking mode in regards to weather (e.g., snow, rain, strong wind, temperature, and the like), causing driver's discomfort.

SUMMARY

The present disclosure provides a method for guiding a parking mode in a remote automatic parking support system having a first mode in which automatic parking is performed based on a parking request from a smart key or a smartphone of a driver positioned extraneous to a vehicle and a second mode in which automatic parking is performed based on a parking request from a switch mounted within the vehicle, capable of providing optimal convenience to a driver by guiding the first mode or the second mode according to a surrounding environment.

Technical subjects of the present disclosure are not limited to the foregoing technical subjects and any other technical subjects not mentioned herein may be clearly understood by a person skilled in the art from the present disclosure described hereinafter. Also, it may be easily understood that the advantages, features and aspects of the present disclosure may be realized by means and combinations demonstrated in claims.

According to an exemplary embodiment of the present disclosure, a method for guiding a parking mode in a remote automatic parking support system may include: detecting a surrounding environment when a parking space is searched; guiding a first parking mode in which automatic parking is performed based on a parking request from a driver's terminal positioned extraneous to a vehicle or a second mode in which automatic parking is performed based on a parking request from a switch mounted within the vehicle, based on the detected surrounding environment; and performing automatic parking in a parking mode selected by a driver.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
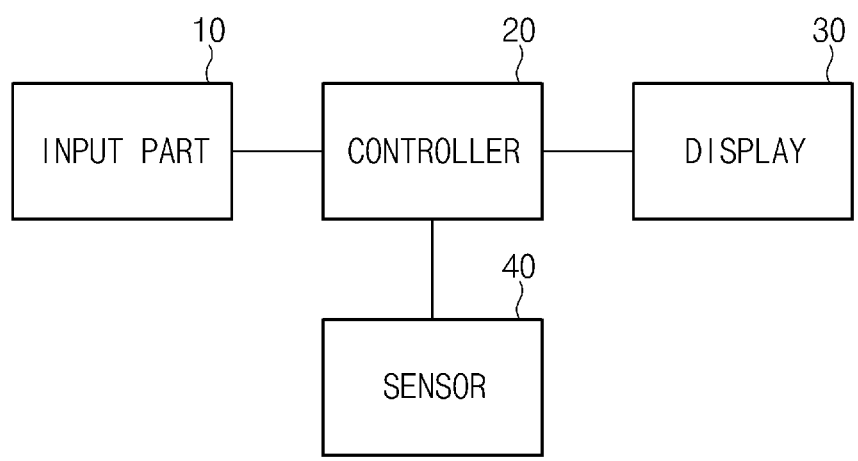
FIG. 1 is a view illustrating a configuration of an exemplary embodiment of a remote automatic parking support system to which the present disclosure is applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The aforementioned objects, features and advantages will become more apparent through the following detailed description with respect to the accompanying drawings, the technical idea of the present disclosure with a person of ordinary skill in the art to which the present disclosure pertains, accordingly, can be easily carried out. In describing the present disclosure, when it is determined that a detailed description of known techniques associated with the present disclosure unnecessarily obscure the gist of the present disclosure, the detailed description thereof will be omitted.

Exemplary embodiments of the present disclosure will now be described in detail with reference to the accompanying drawings. FIG. 1 is a view illustrating a configuration of an exemplary embodiment of a remote automatic parking support system to which the present disclosure is applied. As illustrated in FIG. 1, the remote automatic parking support system to which the present disclosure is applied may include an input part 10, a controller 20, a display 30, and a sensor 40. The input part 10 may be an input device, interface, or receiving component configured to receive user input and the controller 20 may be configured to operate the input part 10, the display 30, and the sensor 40.

In particular, the input part 10 may be configured to receive a selection signal regarding a parking mode from a terminal (e.g., a smart key or a smartphone) of a driver. The input part 10 may provide a wireless communication interface with respect to the smart key or the smartphone. The input part 10 may also be configured to receive a selection signal regarding a parking mode from a switch mounted within the vehicle. In particular, the switch may be operated by the driver. Additionally, the input part 10 may be configured to receive a selection signal regarding a parking mode from a touch pad provided in an audio, video, navigation (AVN) system and the touch pad is operated by the driver.

Further, the controller 20 may be configured to execute general operate to enable each of the elements to function normally. In particular, the controller 20 may include a memory configured to store an algorithm (first mode algorithm) required for performing automatic parking based on a parking request from the driver's terminal positioned extraneous to the vehicle and an algorithm (second mode algorithm) required for performing automatic parking based on a parking request from the switch mounted within the vehicle. In particular, when the driver has difficulty in exiting the vehicle after parking or when an average speed from the start point of searching for a parking space and an end point exceeds a threshold value, the controller 20 may be configured to guide the vehicle in the first mode through the display 30 (e.g., park the vehicle based on the first mode). Additionally, during poor weather conditions (e.g., snow, rain, etc.), the controller 20 may be configured to guide the vehicle in the second mode through the display 30 (e.g., park the vehicle based on the second mode).

For example, the controller 20 may be configured to detect rain using a rain sensor mounted in an auto wiper system of the vehicle, and sense an ambient temperature using a temperature sensor. In addition, in performing automatic parking, the controller 20 may be configured to automatically select front end parking or back-in parking based on states of a neighbor vehicle (e.g., the controller selects an entry method into the space based on the parking position of surrounding vehicles). For example, when the neighbor vehicle (e.g., a vehicle proximate to the subject vehicle) is parked as back-in parking (e.g., with the front of the vehicle facing outwards), the controller 20 may be configured to perform back-in parking where the rear of the vehicle enters the parking space, and when the neighbor vehicle is parked as front end parking (e.g., with the rear of the vehicle facing outward), the controller 20 may be configured to perform front end parking where the front of the vehicle may enter into the parking space.

Additionally, when an auto-hold function of the vehicle is in an ON state, the controller 20 may be configured to automatically release the auto-hold function and perform automatic parking, and when parking ends (e.g., is complete), the controller 20 may be configured to engage an electric parking brake (EPB) (P-position shifting, start off). When automatically pulling out the vehicle and the vehicle reaches a target position, the controller 20 may be configured to detect input (e.g., brake and acceleration engagement) of the driver and provide over a control right to the driver. In other words, the automatic vehicle control may terminate and the driver may take over the control of the vehicle without controller intervention.

Thereafter, the display 30 may be operated by the controller 20 to display the first mode or the second mode. In particular, the display 30 may be configured to display the first mode or the second mode in various forms such as an image, text, video, and the like. The sensor 40 may include an ultrasonic sensor configured to sense a distance to an obstacle, a steering angle sensor, a wheel pulse sensor, a yaw rate sensor, and a temperature sensor. The ultrasonic sensor may include a plurality of front ultrasonic sensors configured to sense an obstacle in front of a vehicle, a plurality of side ultrasonic sensors configured to sense a lateral obstacle (e.g., an obstacle disposed at the sides of the vehicle), a plurality of rear ultrasonic sensors (e.g., four rear ultrasonic sensors) configured to sense a movement of an obstacle at the rear side of the vehicle. In addition, the steering angle sensor, the wheel pulse sensor, and the yaw rate sensor may be configured to sense a steering direction and a steering angle of the vehicle.

Figure 2:
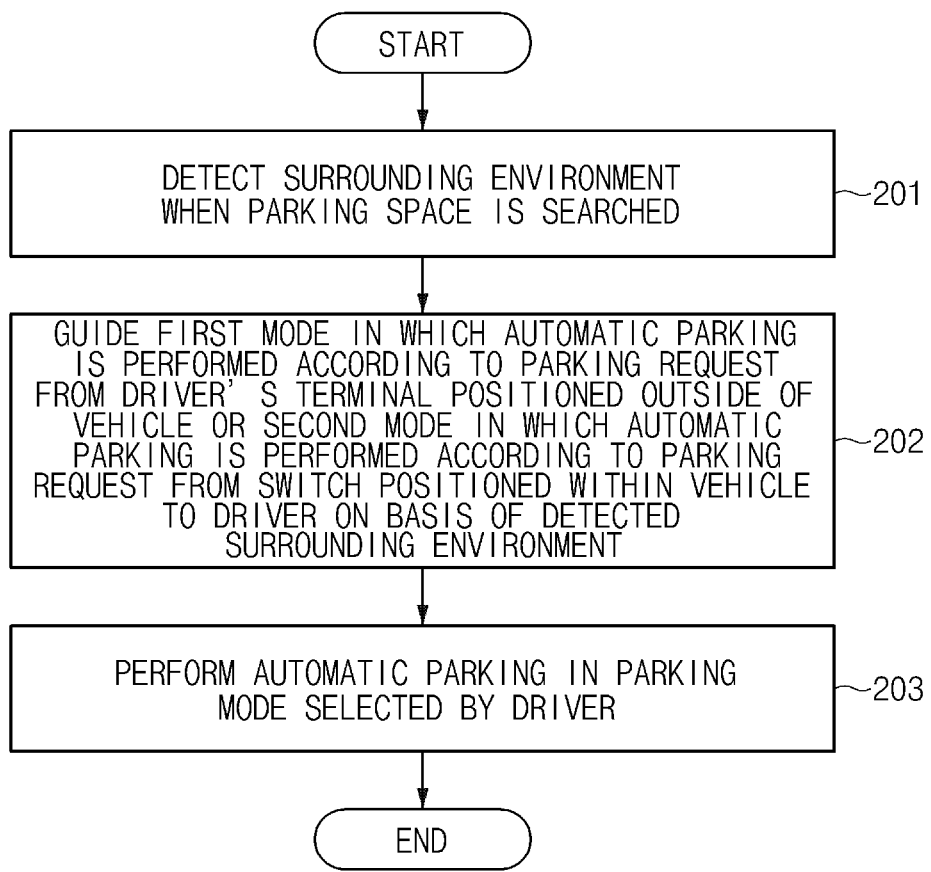
FIG. 2 is a flow chart illustrating an exemplary embodiment of a method for guiding a parking mode in a remote automatic parking support system according to the present disclosure.

FIG. 2 is a flow chart illustrating an exemplary embodiment of a parking mode guiding method in a remote automatic parking support system according to the present disclosure, which is performed under the control of the controller 20. First, when a parking space is detected, a surrounding environment is detected in operation 201. In other words, a width of a parking space, weather conditions (e.g., rain, snow, etc.), an outdoor temperature, parking state of a neighbor vehicle may be determined using the sensor 40.

A first mode may be displayed on the display 30 in which automatic parking may be performed based on a parking request from a driver's terminal positioned extraneous to a vehicle or a second mode in which automatic parking may be performed based on a parking request from a switch mounted within the vehicle, based on the detected surrounding environment, in operation 202. For example, when exiting the vehicle after parking is difficult due to space constraints or an average speed from a start point of searching for a parking space to an end point exceeds a threshold value, the vehicle may be guided in the first mode. Additionally, when a poor weather condition is detected (e.g., when it rains, when a temperature exceeds a first threshold value (e.g., about 30° C.), when the temperature is less than a second threshold voltage (e.g., about 5° C.), when it is snowing, and the like), the vehicle may be guided in the second mode.

Thereafter, when a parking mode is selected through the input part 10, automatic parking may be performed in the corresponding parking mode in operation 203. In particular, in performing automatic parking, the controller may be configured to automatically select front end parking or back-in parking based on the parking states of a neighbor vehicle. In other words, when the neighbor vehicle is parked as back-in parking, the controller 20 may be configured to perform back-in parking, and when the neighbor vehicle is parked as front end parking, the controller 20 may be configured to perform front end parking. Additionally, when an auto-hold function of the vehicle is in an ON state, the controller 20 may be configured to automatically release the auto-hold function and perform automatic parking. When parking is complete, the controller 20 may be configured to engage the EPB (e.g., park (P) position shifting, start off). When automatically pulling out the vehicle (e.g., driving out of the parking space) and the vehicle reaches a target position, the controller 20 may be configured to detect driver input (e.g., brake and acceleration pedal engagement) and provide the driving control to the driver, that is, terminate the automatic control. Accordingly, optimal convenience may be provided to the driver.

As described above, in the remote automatic parking support system having the first mode in which automatic parking is performed based on a parking request from a smart key or a smartphone of a driver positioned extraneous to a vehicle and the second mode in which automatic parking is performed based on a parking request from a switch mounted within the vehicle, the vehicle may be guided in the first mode or the second mode through a screen (e.g., by the first or second modes being displayed on the screen) or by voice according to a surrounding environment, thereby providing optimal convenience to the driver.

The method of the present disclosure described above may also be created as a computer program, and codes and code segments configuring the program may be easily inferred by programmers in the art. In addition, the created program may be stored in a computer-readable recording medium (an information storage medium) and read and executed by a computer to implement the method of the present disclosure. The recording medium includes any type of recording medium that can be read by a computer.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for guiding a vehicle in a parking mode in a remote automatic parking support system, comprising:
   detecting, by a processor, a width of a parking space, a weather condition, an outdoor temperature, and a parking state of a neighbor vehicle when the parking space is detected;
   guiding, by the processor, the vehicle in a first parking mode in which automatic parking is performed based on a parking request from a driver terminal positioned extraneous to a vehicle when the width of the parking space is less than a reference value;
   guiding, by the processor, the vehicle in a second parking mode in which automatic parking is performed based on a parking request from a switch mounted within the vehicle when rain is detected, when the outdoor temperature exceeds a first threshold value, and when the outdoor temperature is less than a second threshold value; and
   performing, by the processor, automatic parking in a parking mode selected by a driver.

2. The method according to claim 1, wherein, in the performing of the automatic parking, front end parking or back-in parking is automatically selected based on the parking state of the neighbor vehicle.

3. The method according to claim 1, wherein, in the automatic parking, when an auto-hold function of the vehicle is in an ON state, the auto-hold function is automatically released and automatic parking is performed.

4. The method according to claim 1, wherein, in the automatic parking, when automatic parking ends, park-position shifting is performed and an engine of the vehicle is subsequently turned off.

5. A remote automatic parking support system for a vehicle, comprising:
   a sensor configured to detect a width of a parking space, a weather condition, an outdoor temperature, and a parking state of a neighbor vehicle;
   a controller configured to guide the vehicle in a first parking mode in which automatic parking is performed based on a parking request from the driver terminal positioned extraneous to a vehicle when the width of the parking space is less than a reference value, and a second parking mode in which automatic parking is performed based on a parking request from a switch mounted within the vehicle when rain is detected, when the outdoor temperature exceeds a first threshold value, and when the outdoor temperature is less than a second threshold value; and
   a display configured to output the first parking mode or the second parking mode.

6. The system of claim 5, wherein front end parking or back-in parking is automatically selected based on the parking state of the neighbor vehicle.

7. A non-transitory computer readable medium containing program instructions executed by a processor for guiding a vehicle in a parking mode in a remote automatic parking support system, the computer readable medium comprising:

program instructions that detect a width of a parking space, a weather condition, an outdoor temperature, and a parking state of a neighbor vehicle when the parking space is detected;

program instructions that guide the vehicle in a first parking mode in which automatic parking is performed based on a parking request from a driver terminal positioned extraneous to a vehicle when the width of the parking space is less than a reference value;

program instructions that guide the vehicle in a second mode in which automatic parking is performed based on a parking request from a switch mounted within the vehicle when rain is detected, when the outdoor temperature exceeds a first threshold value, and when the outdoor temperature is less than a second threshold value; and program instructions that perform automatic parking in a parking mode selected by a driver.

8. The non-transitory computer readable medium of claim 7, wherein front end parking or back-in parking is automatically selected based on the parking state of the neighbor vehicle.

* * * * *